United States Patent [19]

Ogawa

[11] Patent Number: 4,761,316

[45] Date of Patent: Aug. 2, 1988

[54] RECORDING MEDIUM AND METHOD OF PRODUCING THE SAME

[75] Inventor: Kazufumi Ogawa, Hirakata, Japan

[73] Assignee: Matsushita Electric Industrial Co., Ltd., Osaka, Japan

[21] Appl. No.: 799,451

[22] Filed: Nov. 18, 1985

[30] Foreign Application Priority Data

Nov. 19, 1984 [JP] Japan ................................ 59-243677

[51] Int. Cl.⁴ ................................................ G11B 5/72
[52] U.S. Cl. ........................................ 428/64; 427/44;
427/54.1; 427/128; 427/130; 427/131; 427/132;
428/447; 428/694; 428/695; 428/900
[58] Field of Search ................ 427/131, 128, 44, 130,
427/132, 54.1; 428/695, 694, 900, 447, 64, 65;
360/134–136

[56] References Cited

U.S. PATENT DOCUMENTS

| 4,368,239 | 1/1983 | Nakajima | 428/695 |
| 4,429,024 | 1/1984 | Ueno | 427/41 |
| 4,434,210 | 2/1984 | Nakajima | 427/44 |
| 4,583,145 | 4/1986 | Mönnich | 428/695 |
| 4,599,266 | 7/1986 | Nakayama | 427/131 |
| 4,601,950 | 7/1986 | Iida | 428/447 |

FOREIGN PATENT DOCUMENTS 0121519  6/1985  Japan ................................ 428/695

Primary Examiner—Ellis P. Robinson
Attorney, Agent, or Firm—Wenderoth, Lind & Ponack

[57] ABSTRACT

A recording medium which comprises a base body, a recording layer formed on the base body, and a protection layer formed on the recording layer for protecting the recording layer. The protection layer is made from silane surface active agent and the agent is polymerized and bonded to the recording layer. The recording medium provides high density recording performance.

13 Claims, 4 Drawing Sheets

RECORDING MEDIUM AND METHOD OF PRODUCING THE SAME

BACKGROUND OF THE INVENTION

This invention relates to a recording medium and method of producing the same, and more particularly to forming a protection layer on a recording layer of a recording medium such as magnetic tape, magnetic disc, magnetic card, opto-magnetic disc, optical disc, etc.

The conventional technology is explained by reference to a magnetic recording medium as one example of a recording medium.

Magnetic recording media are roughly classified into two types, i.e., coating type and deposition type.

The coating type magnetic recording medium is generally formed by the following method. Magnetic powder such as $Fe_2O_3$ or $\gamma\text{-}Fe_2O_3$ having an additive of CO is mixed with polyvinyl, butyral, toluene, methyl isobutyl ketone so that the mixed material becomes a coating agent. Then, the coating agent is applied on a surface of a base of the recording medium by $4 \sim 5$ $\mu$m thickness. This method has an advantage that production of the recording medium is easy, but has a disadvantage that performance is not enough for use in high density recording since there is a limit to reduce the size of magnetic powder.

In contrast, deposition type has better recording density than that of coating type, but has a problem of durability since magnetic metal layer is exposed on the surface of the recording medium. To solve this problem, overcoating is applied on a deposition metal layer of $1000 \sim 2000$ Å which is formed by use of spattering method or of electron beam, and further, smoothing agent is applied on the deposition metal layer. However, even this processing can not solve the problem perfectly. That is, enough durability can not be obtained. In addition, since overcoating and coating of the smoothing agent of thinner and even thickness are difficult to carry out, the gap between a recording or reading magnetic head and a recording layer is widened so that it is difficult to obtain enough high density recording performance.

SUMMARY OF THE INVENTION

Accordingly, a principal object of the invention is to provide a recording medium which is capable of providing high density recording performance, and to provide a method of producing such a recording medium.

These and other objects will be accomplished by a recording medium which comprises a base body of the recording medium, at least one recording layer formed on the base body, and at least one protection layer formed on the recording layer for protecting the recording layer. The protection layer is made from silane surface active agent and the agent molecules are polymerized to one another and also chemically bonded to the recording layer.

In a specific embodiment, a chemical substance of $CH_2=CH-(CH_2)_n-SiCl_3$ (n: integer) is used as said silane surface active agent. The vinyl groups of the silane surface active agent are bridged to one another by energy beam-irradiation thereto. Fluorine may be added to vinyl groups of the silane surface active agent by processing in plasma including fluorine. Hydroxy group may be added to vinyl groups of said silane surface active agent by use of diborane and alkaline hydrogen peroxide. The recording and protection layers may be formed on both surfaces of the base body. A part of hydrocarbon of said silane surface active agent may be replaced by a functional group of $-C\equiv C-C\equiv C-$. The base body may be made of a material which is optically transparent. The recording medium may be magnetic recording medium, optical recording medium or recording disc.

This invention also relates to a method of producing a recording medium which comprises the steps of forming a recording layer on a base body of the recording medium, and forming a protection layer on the recording layer. The protection layer is made from silane surface active agent, and the agent molecules are polymerized to one another and chemically bonded to the recording layer by use of chemical adsorption technique.

In a specific embodiment, a chemical substance of $CH_2=CH-(CH_2)_n-SiCl_3$ (n: integer) is used as the silane surface active agent and vinyl groups of the agent are bridged to one another. The silane surface active agent may be processed in an atmosphere including fluorine plasma gas. After chemical adsorption of the agent is conducted, the recording medium is immersed into diborane and alkaline hydrogen peroxide so that hydroxy groups are added to the vinyl groups of the silane surface active agent, and then, chemical adsorption of another silane surface active agent is conducted.

This invention has various advantages, among which are as follows.

(1) It may make it possible to provide a recording medium which is capable of high density recording.

(2) It may be possible to provide a recording medium which has a very thin organic film of high density formed on a surface thereof, without pin-holes, of even thickness. Therefore, in case that the recording medium is, for example, a magnetic recording medium, performance of a recording and reproducing magnetic head is improved and noise is reduced.

(3) It may be possible to provide a method of producing a recording medium in which an organic thin film can be coated on a surface of a base of a recording medium, which film is pin-hole free and of even thickness. If the organic thin film is polymerized by the irradiation of plasma or energy beam, finer film can be obtained. Further, if it is processed by use of a plasma in gas including fluorine, smoothing characteristic can be applied on the surface of the organic film so that smoothing characteristic of the head, i.e., durability is improved.

The invention will be better understood, along with other objects and features thereof, from the following detailed description in conjunction with the drawings.

DETAILED DESCRIPTION OF THE INVENTION

Figure 1:
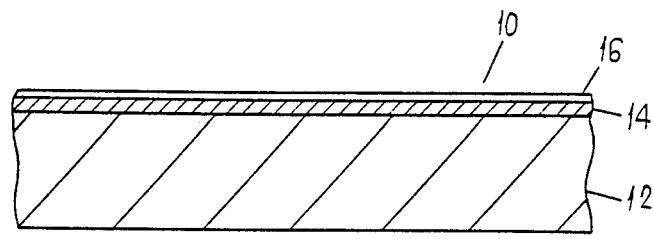
FIG. 1 is a section view of a magnetic recording medium as a first embodiment of the invention.
Figure 2:
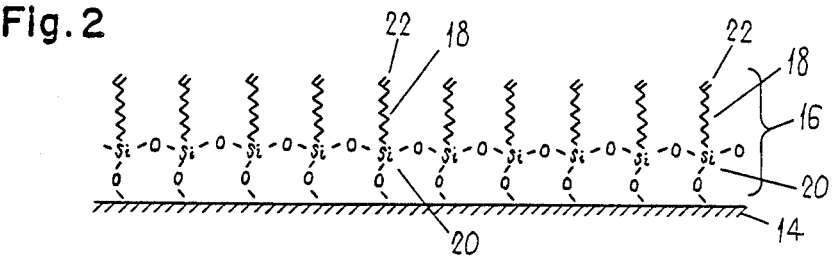
FIGS. 2 and 3 show processes for producing the recording medium of the first embodiment.
Figure 3:
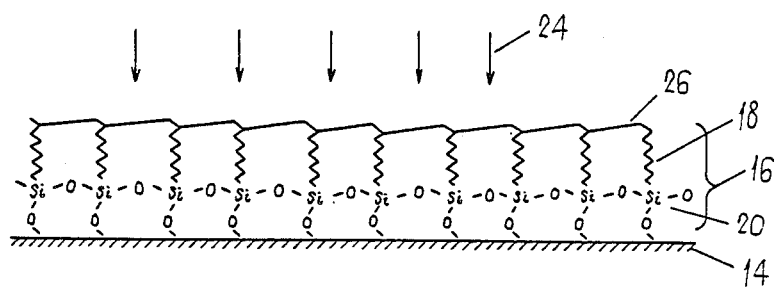

FIGS. 1, 2 and 3 show a magnetic recording medium as a first embodiment of the invention. The magnetic recording medium 10, as shown in FIG. 1, is constructed as follows. That is, there is provided a disc plate 12 for magnetic recording use (base of recording medium). Magnetic recording layer 14 (e.g., magnetic metal or magnetic metal oxide such as Fe—Ni, Ni—C$_2$, Fe$_2$O$_3$) is formed on the disc plate 12 by use of spattering deposition method, etc. Thereafter, silane surface active agent is absorbed to the magnetic recording layer 14 and polymerized to one another by bonding of silicon and oxygen by use of chemical adsorption method so that monomolecular protection film 16, which is produced by the silane surface active agent, is formed.

For example, as the silane surface active agent 18, CH$_2$=CH—(CH$_2$)$_n$—SiCl$_3$ (n: integer, the value of approximately 10~20 is the easiest to handle) is used as shown in FIG. 2. There is provided a solution of 80% n-hexane, 12% trichloro methane and 8% chloroform which are dissolved by concentration of approximately $2\times10^{-3}$~$5.0\times10^{-2}$ Mol/l. Then, the base of recording medium base 12 on which the magnetic recording layer 14 is formed is immersed in the above-stated solution. As a result, bonding 20 of

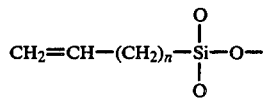

is formed between magnetic recording layer 14 and the silane surface active agent 18 since natural oxide is formed on the metal surface of the magnetic recording layer 14, so that monomolecular protection film 16, which is formed by polymerization of the silane surface active agent, is further formed up to the thickness of 20~30 Å. In this case, vinyl group (CH$_2$=CH—) 22, which is located at one end of the silane surface active agent 18, is juxtaposed on the surface of the protection film 16.

In FIG. 2, energy beam 24 (see, FIG. 3) such as electron beam, X-ray, $\gamma$-ray, ultra violet ray, ion beam, etc. is irradiated on the surface of the protection film 16 so that vinyl groups 22 are bridged (see, 26 in FIG. 3) to one another, and the monomolecular protection film 16 is reinforced and stabilized.

Figure 4:
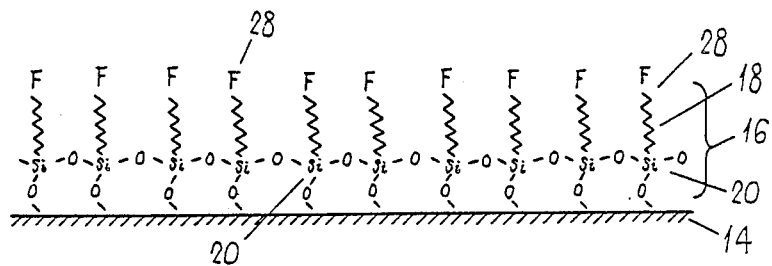
FIG. 4 is a section view of a recording medium as a second embodiment of the invention.

Second embodiment of the invention is shown in FIG. 4. In this embodiment, the recording medium of the structure shown in FIG. 2 is processed in an atmosphere of high frequency plasma such as CF$_4$ which includes fluorine and is of approximately $10^{-3}$ torr. As a result, adding of F and the above-stated bridging are simultaneously carried out, and it also becomes possible to improve smoothness of the surface of the magnetic recording medium.

Figure 5:
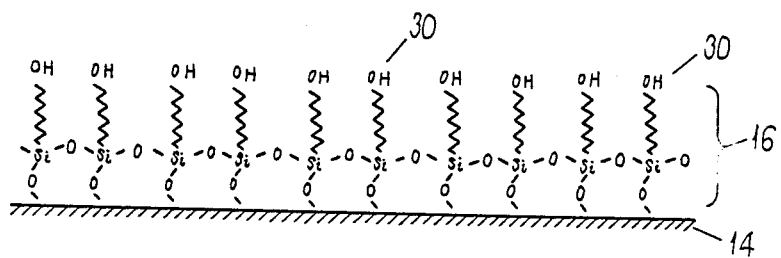
FIGS. 5 and 6 show processes for producing a recording medium of a third embodiment.
Figure 6:
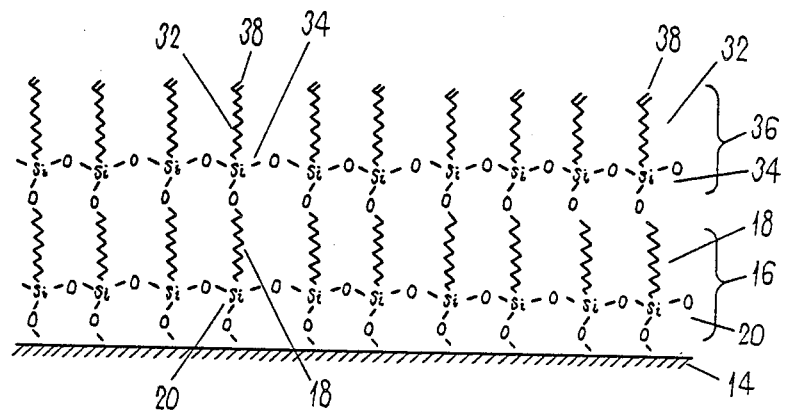

Third embodiment of the invention is shown in FIGS. 5 and 6. This embodiment is used to slightly increase the thickness of the protection film 16. In this embodiment, the recording medium of the structure shown in FIG. 2 is immersed first into a THF solution of diborane—1 Mol/l at room temperature, and then, immersed into a solution of NaOH—0.1 Mol/l and 30% H$_2$O$_2$. As a result, OH groups 30 are added to the vinyl groups on the surface of the protection film 16 as shown in FIG. 5. Thereafter, like the first embodiment, additional silane surface active agent 32 is added to the surface of the protection film 16 by use of chemical adsorption method. That is, bonding 34 of

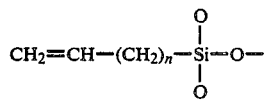

is formed between the OH groups 30 and trichloro silane groups of the silane surface active agent 32 so that another monomolecular film 36 is formed on the monomolecular film 16. By repeating the above-stated process including chemical adsorption process and OH adding process, a protection film having the desired thickness can be formed. Incidentally, 38 denotes vinyl group which is located at one end of silane surface active agent 32.

Figure 7:
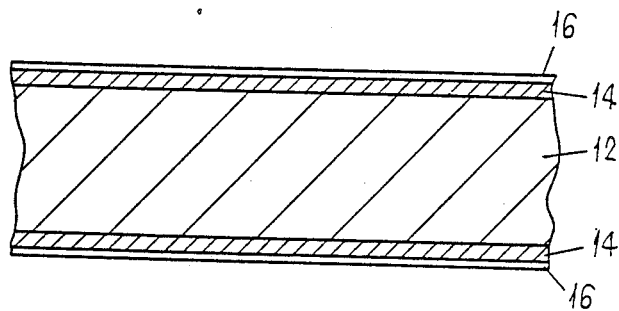
FIG. 7 is a section view of a recording medium as a fourth embodiment.

Fourth embodiment of the invention is shown in FIG. 7. The first embodiment is of the recording medium wherein the recording layer is formed on only one surface of the medium, whereas the fourth embodiment is of the recording medium wherein the recording layer 14 and protection film 16 are formed on both surfaces of the base 12.

Figure 8:
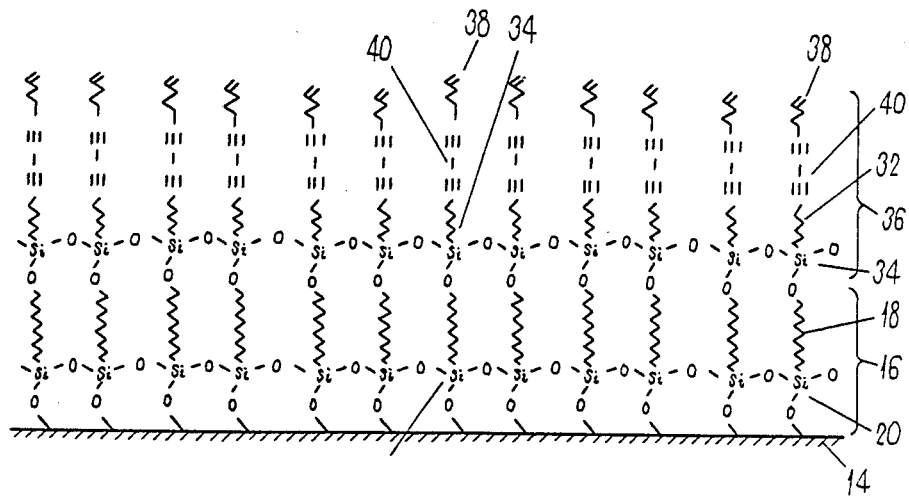
FIGS. 8 and 9 show processes for producing a recording medium of a fifth embodiment.
Figure 9:
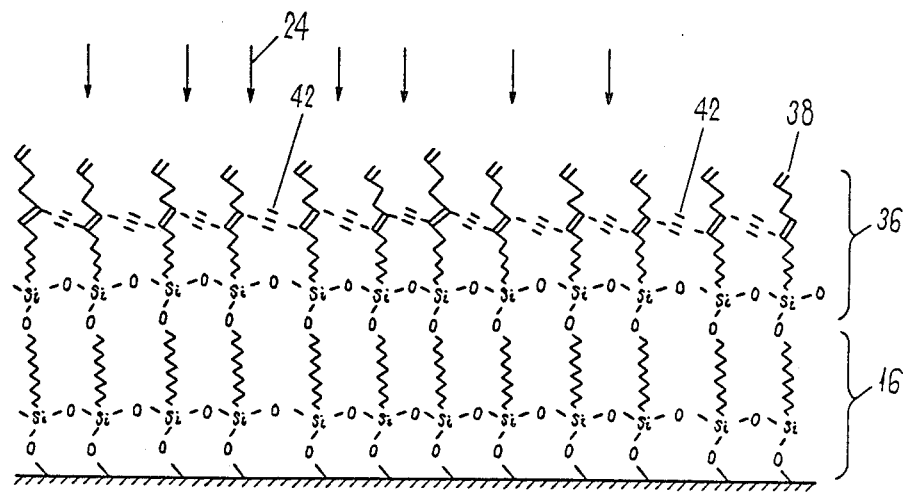

Fifth embodiment of the invention is shown in FIGS. 8 and 9. The structure shown in FIG. 8 is almost the same as that shown in FIG. 6. The difference is that diacetylene group (—C≡C—C≡C—) 40 is included in normal chain carbon bonding (—(CH$_2$)$_n$—) of the silane surface active agent 32. That is, the silane surface active agent 32 in FIG. 8 is, for example, CH$_2$=CH—(CH$_2$)$_n$—C≡C—C≡C—(CH$_2$)$_m$—SiCl$_3$ (wherein, n, m: integer, m+n=10~20).

In FIG. 8, energy beam 24 (see, FIG. 9) is irradiated on the surface of the protection film (16+36) so that the diacetylene groups 40 are bonded (see, 42 in FIG. 9) on the whole surface of the medium and the accumulated protection film (16+36) has electric conductivity in the surface direction thereof.

Incidentally, acetylene groups, or cyano groups may be used instead of the vinyl group of the silane surface active agent. Dichloro silane group, monochloro silane group or an agent in which both groups are mixed may be used instead of trichloro silane group.

Figure 10:
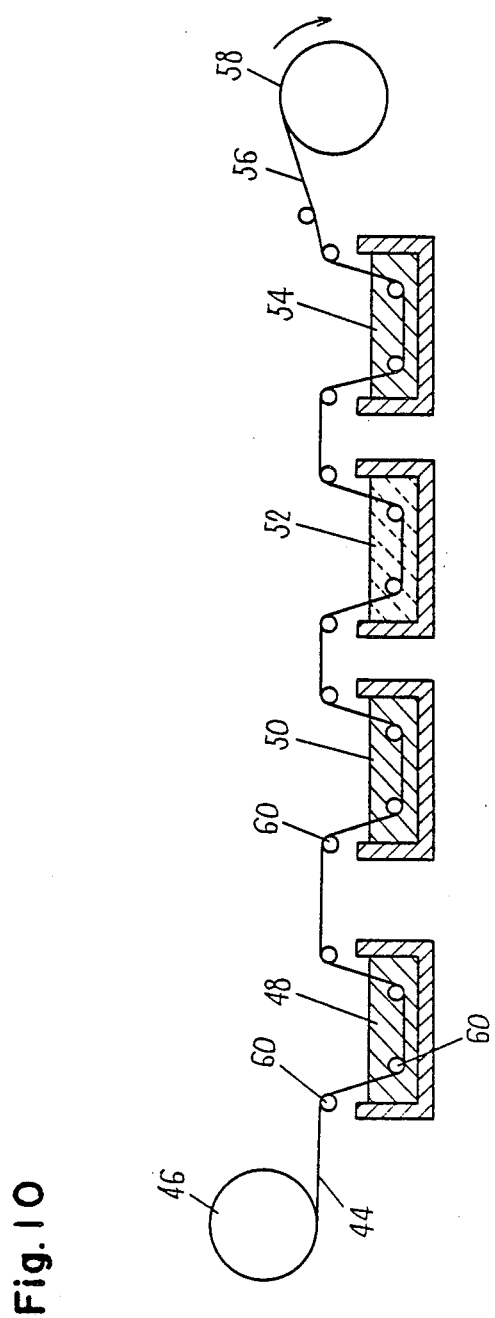
FIG. 10 shows a machine for producing the recording medium.

Sixth embodiment is shown in FIG. 10. In case that the recording medium is a magnetic recording tape, a tape manufacturing machine shown in FIG. 10 may be used. An uncoated magnetic recording tape 44 which is supplied from supply drum 46 passes through first solution 48 for chemical adsorption, first reaction solution 50, second reaction solution 52 and second solution 54 for chemical adsorption, respectively so that tape 56 having the recording layer and protection film is obtained and taken up by take-up drum 58. In FIG. 10, 60 denotes a capstan for forming a tape feed path.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A recording medium comprising:

a base body;

at least one recording layer formed on said base body; and at least one protection layer formed on said recording layer for protecting said recording layer, said protection layer being at least one monomolecular layer of polymerized silane surface active agent of the formula $CH_2=CH-(CH_2)_n-C\equiv C-C\equiv C-(CH_2)_m-SiCl_3$ (n and m are integers) chemically bonded to said recording layer.

2. The recording medium of claim 1 wherein, said base body is optically transparent.

3. The recording medium of claim 1, wherein vinyl groups of said silane surface active agent are bridged to one another by energy beam-irradiation thereto.

4. The recording medium of claim 1, wherein fluorine is added to vinyl groups of said silane active agent by processing in plasma including fluorine.

5. The recording medium of claim 1, wherein said recording medium is a magnetic recording medium, optical recording medium or recording disc.

6. The recording medium of claim 1, wherein said recording and protection layers are formed on both surfaces of said base body.

7. A recording medium comprising:

a base body;

at least one recording layer formed on said base body; and at least one protection layer formed on said recording layer for protecting said recording layer, said protection layer being at least one monomolecular layer of polymerized silane surface active agent chemically bonded to said recording layer, said silane surface active agent being a compound of the formula $CH_2=CH-(CH_2)_n-SiCl_3$ (n: integer) having hydroxy groups added to vinyl groups of said silane surface active agent by use of diborane and alkaline hydrogen peroxide.

8. The recording medium of claim 7, wherein said recording and protection layers are formed on both surfaces of said base body.

9. The recording medium of claim 7, wherein said base body is optically transparent.

10. The recording medium of claim 7, wherein said recording medium is a magnetic recording medium, optical recording medium or recording disc.

11. A method of producing a recording medium comprising the steps of:

forming a recording layer on a base body for said recording medium;

forming a protection layer on said recording layer, said protection layer being at least one monomolecular layer of polymerized silane surface active agent of the formula $CH_2=CH-(CH_2)_n-SiCl_3$ (n: integer) chemically bonded to said recording layer by use of a chemical adsorption technique;

immersing the resultant product into diborane and alkaline hydrogen peroxide so that hydroxy groups are added to vinyl groups of the silane surface active agent; and conducting chemical adsorption of additional silane surface active agent onto the hydroxy groups.

12. The method of claim 11, wherein chemical vinyl groups of said silane surface active agent are bridged to one another.

13. The method of claim 11, wherein said silane surface active agent is processed in a plasma atmosphere including fluorine gas.

* * * * *